Patented Mar. 25, 1924.

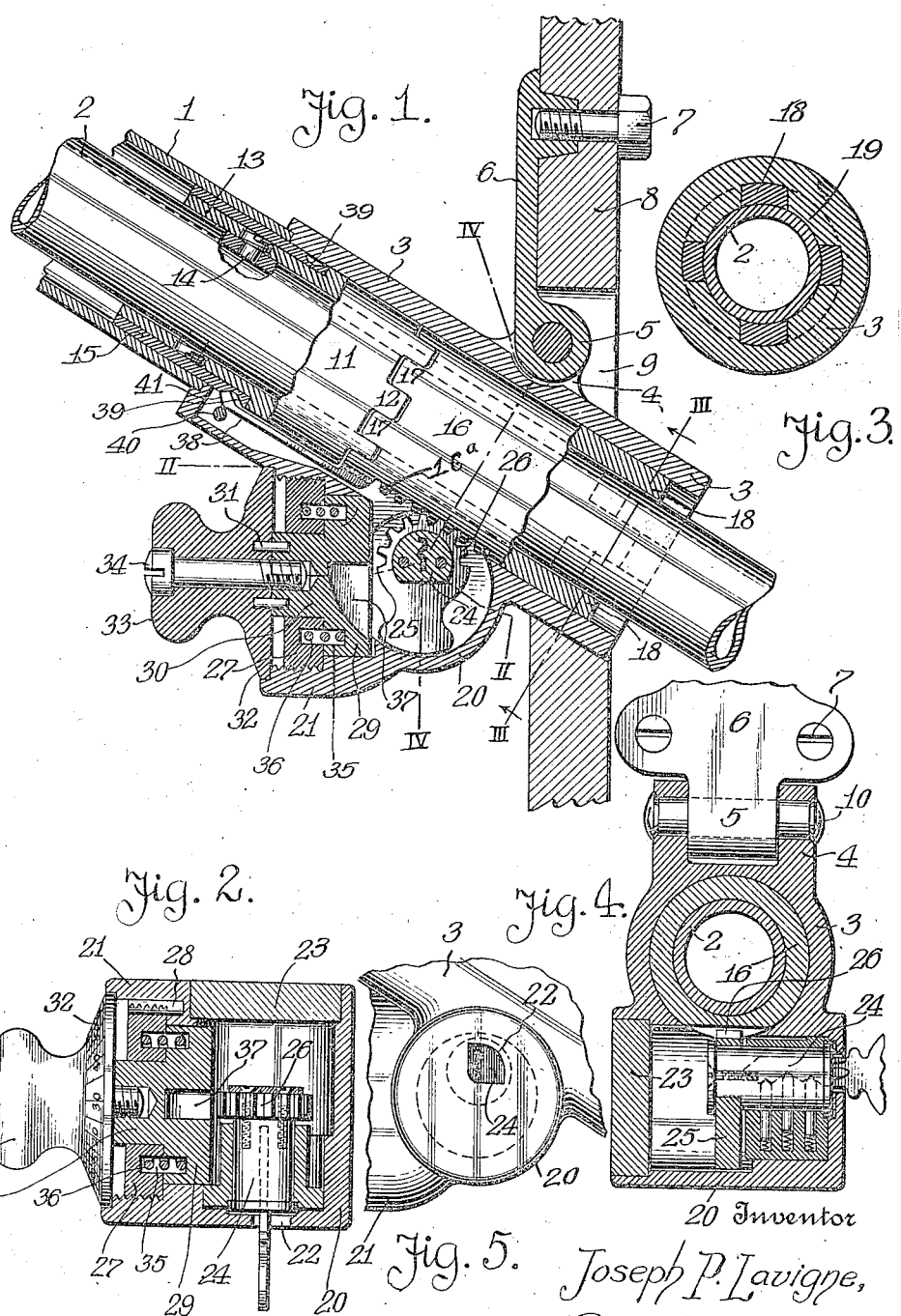

1,487,863

UNITED STATES PATENT OFFICE.

JOSEPH P. LAVIGNE, OF DETROIT, MICHIGAN.

STEERING-GEAR LOCK.

Application filed May 19, 1919. Serial No. 297,980.

*To all whom it may concern:*

Be it known that I, JOSEPH P. LAVIGNE, a citizen of the United States of America, residing at Detroit, in the county of Wayne and State of Michigan, have invented certain new and useful Improvements in Steering-Gear Locks, of which the following is a specification, reference being had therein to the accompanying drawings.

This invention relates to locks, and has special reference to that class of locking devices used for locking the steering gear of an automobile or similar vehicle so that the vehicle cannot be stolen or surreptitiously removed.

The primary object of my invention is to combine a key operated lock and a permutation lock in a manner that permits of said lock cooperating in positively locking a steering shaft, post or other member against rotation, and provision is made so that the locks or parts associated therewith cannot be conveniently tampered with in an endeavor to release the rotatable member held thereby.

Another object of my invention is to combine a key operated lock and a permutation lock in such a manner that the key operated lock cannot be operated until the permutation lock is correctly positioned to provide clearance for a movable element of the key operated lock, thereby necessitating an understanding of the permutation lock in order that the same may be set to permit of the key operated lock being used. The two locks are combined so that easy access may be had to either when the locking device is associated with a steering column, it being located at the juncture of the column with the dash or control board of an automobile, so as not to interfere with a steering wheel or any other devices at the upper end of the steering column. Then again, provision is made so that the locking device may be held by the dash or control board of the automobile, and permit of the steering column being placed at a desired angle relative thereto. In this manner, the locking device becomes applicable to the steering columns of various types of automobiles.

A further object of my invention is to provide a locking device for a rotary member which is provided with a fixed locking member and a reciprocable locking member. Novel means is associated with the fixed locking member so as to prevent its removal and the greater part of my locking device is associated with the reciprocable member so that said member may be employed to prevent rotation of the rotary member when said reciprocable member is locked in engagement with a fixed member of the rotary member. It is therefore possible to use the locking mechanism in connection with any rotary member having a support in proximity thereto for the locking mechanism.

A still further object of my invention is to provide a locking mechanism of the above type that is durable and occupies a comparatively small space relative to the rotary member or element to be held thereby, and the mechanical construction by which I attain these results will be hereinafter specifically described and then claimed.

Reference will now be had to the drawing, wherein—

Figure 1 is a longitudinal sectional view of the locking device as applied to a steering column;

Fig. 2 is a horizontal sectional view taken on the line II—II of Fig. 1;

Fig. 3 is a cross sectional view taken on the line III—III of Fig. 1;

Fig. 4 is a similar view taken on the line IV—IV of Fig. 1, and

Fig. 5 is a side elevation of a portion of the lock.

In the drawing, the reference numeral 1 denotes the steering column containing a steering shaft 2 and the lower end of the column 1 is supported by a tubular casing 3 having apertured ears 4 between which extend the barrel 5 of a supporting plate 6. The supporting plate 6 is adapted to be connected by screws 7 or other fastening means to the dash or control board 8 of an automobile, said dash having an opening 9 providing clearance for the casing 3 and the barrel 5, so that the casing 3 can be pivotally connected to the barrel 5 by a pivot pin or rivet 10, best shown in Fig. 4 of the drawing. This pivotal connection between the casing 3 and the supporting plate 6 permits of the casing 3 being supported at a desired angle relative to the dash 8, and it is therefore possible to install my locking device on any steering column since the locking device will conform to the angle of said column relative to the dash or control board of an automobile.

Mounted on the steering shaft 2 within the upper end of the casing 3 is a locking member 11 which has the lower end thereof provided with a series of teeth or notches 12 and the upper end thereof reduced, as at 13 and connected to the steering shaft 2 by screws 14, said screws having the heads thereof countersunk in the reduced end 13 of the locking member 11. The reduced end 13 of said locking member provides clearance for a guard sleeve 15 which surrounds the reduced end 13 of the locking member in the steering column 1 and the casing 3, said sleeve preventing easy access to the heads of the screws 14, and provision is made, in a manner as hereinafter set forth, for locking the sleeve 15 against surreptitious removal.

Slidable on the steering shaft 2 in the lower end of the casing 3 is a reciprocable locking member 16 having teeth or notches 17 adapted to interlock with the teeth or notches 12 of the fixed locking member 11, and the lower end of the reciprocable locking member 16, has a plurality of tongues 18 extending between inwardly projecting lugs 19 carried by the casing 3, said lugs cooperating with the tongues 18 in preventing rotation of the reciprocable locking member 16 relative to the casing 3, but not interfering with the reciprocable movement of said locking member relative to the fixed locking member 11.

The lower wall of the casing 3, adjacent the dash 8, has a transverse lock housing 20 and a longitudinal lock housing 21, these housings communicating, as best shown in Figs. 1 and 2. The housing 20 is cylindrical or tubular with one end thereof closed, with the exception of a small key hole 22 and the opposite end of said housing is closed by a permanent end plate 23. This permanent end plate during the manufacture of the lock permits of a well known type of key operated lock mechanism being installed in the housing 20, and the lock mechanism has been generally designated 24 and includes tumblers, a key to actuate the tumblers and a holder for said tumblers. Associated with the lock mechanism and adapted to be turned or partially rotated thereby is an arm 25 having a sector gear 26 meshing with a rack 16ª forming part of the reciprocable locking member 16, and with the locking mechanism eccentrically disposed within the housing 20, the arm 25 can only be swung in the direction of the housing 21 which is adapted to provide clearance for the movement of said arm. As shown in Fig. 1, the arm 25 can only be swung in a clockwise direction, and such movement of the arm imparts movement to the reciprocable locking member 16 which is shifted away from the fixed locking member 11 to release said member and permit of the steering shaft 2 being rotated.

Screwed in the housing 21 is a head 27 held against accidental rotation or removal by a pin 28 within said housing, said pin interrupting the screwthreads of the head 27 and being of such material and construction as to be difficult to remove.

In the housing 21 is a rotatable member 29 having a stem 30 extending through the head 27 and connected by a plurality of pins 31 to a rotatable dial member 32 set in the end of the housing 21 and provided with a knob 33. The pins 31 permit of the dial member 32 being reset relative to the rotary member 29, so as to change the combination of the lock, and the dial member is normally fixed relative to the rotatable member 29 by a center screw 34 or other connecting means. The confronting faces of the rotatable member 29 and the head 27 are grooved, as at 35, to accommodate a coiled expansion spring 36, and the expansive force of said spring is adapted to maintain the dial member 32 normally seated in the outer end of the housing 21, yet permit of said dial member being revolved relative to the housing. The dial member 32 has suitable indicia to facilitate setting said dial member so as to correctly position the rotatable member 29 within the housing. The rotatable member 29 has its inner end provided with a kerf or groove 37 and when this kerf or groove is disposed in the plane of the path of travel of arm 25, it provides clearance for such arm, whereby the key operated lock may be operated to swing the arm 25 clockwise and retract the reciprocable locking member 16 relative to the fixed locking member 11.

To lock the sleeve 15 against accidental displacement or removal, the reciprocable locking member 16 has its upper toothed end provided with a resilient detent 38, and the upper end of said detent terminates in an angularly disposed tooth or end 40 adapted to engage in an annular groove 39 provided therefor in the inner end of the sleeve 15. The toothed end of the detent is also adapted to ride over a pin 40 which is located within the casing 3 and constitutes a cam for forcing the tooth 41 of the detent 38 into the groove 39 of the sleeve 15, thereby locking the sleeve against displacement when the reciprocable locking member 16 is in engagement with the fixed locking member 11. The tooth 41 of the detent 38 is shaped to ride out of engagement with the sleeve 15 when the locking member 16 is retracted, and it will be noted that the casing 3 is cut away to provide clearance for said detent.

From the foregoing, it will be observed that it is necessary to set the permutation lock so that the kerf 37 thereof is in the plane of arm 25, before the key lock can be operated to shift the locking member 16. As shown in Fig. 1, it is impossible to rotate the steering shaft 2 by reason of the locking member 16 being non-rotatable relative to the casing 3 and when meshing with the locking member 11 a rigid connection is established between the steering shaft 2 and the casing 3. When the permutation and key locks are properly manipulated and the locking member 16 retracted, then the steering shaft 2 and the fixed locking member 11 may be rotated in the usual manner.

It is preferable to make the casing 3 and expose parts of the locking mechanism of case hardened or drill proof metal so that it will be practically impossible for the locking mechanism to be destroyed with a view of appropriating an automobile or vehicle having its steering mechanism locked by the mechanism.

While in the drawing there is illustrated a preferred embodiment of my invention, it is to be understood that the structural elements are susceptible to such variations and modifications as fall within the scope of the appended claims.

What I claim is:—

1. In a steering gear lock, a reciprocable locking member, a key operated lock adapted to reciprocate said member, said lock having a member movable on an axis the line of which extends entirely outside the path of travel of the reciprocable member, and a permutation lock operative in the control of the operation of said key operated lock.

2. A lock as characterized in claim 1, and wherein the key operated lock includes an arm and the permutation lock has a kerf movable into and out of the path of travel of the arm to selectively provide clearance for the movement of the arm of said key operated lock.

3. In a steering gear lock, a rotatable locking member, a non-rotatable reciprocable locking member adapted to be shifted into and out of engagement with said rotatable locking member, a key operated lock adapted to shift said reciprocable locking member said lock having a member movable on an axis the line of which extends entirely outside the path of travel of the reciprocable member, and a permutation lock operative in the control of the operation of said key operated lock.

4. A lock as characterized in claim 3, and wherein the key operated lock includes an arm and the permutation lock has a kerf movable into and out of the path of travel of the arm to selectively provide clearance for the movement of the arm of said key operated lock.

5. In a lock for a steering shaft, a casing through which said shaft extends, a reciprocable locking member in said casing for said shaft, a key operated lock carried by said casing adapted for shifting said reciprocable locking member, said lock having a member movable on an axis the line of which extends entirely outside the path of travel of the reciprocable member, and a permutation lock adjoining said key operated lock and operative in the control of the operation thereof.

6. A lock as characterized in claim 5, and wherein the key operated lock includes an arm and the permutation lock has a kerf movable into and out of the path of travel of the arm to selectively provide clearance for the movement of the arm of said key operated lock.

7. A steering gear lock as in claim 1 characterized by a rack and gear connection between the reciprocable locking member and the key-operated lock to provide a permanently-operative engagement therebetween.

8. In a lock for a steering gear, the combination of a steering shaft, a casing through which said shaft extends, a fixed locking member on said shaft, a guard sleeve for said fixed locking member, a reciprocable locking member on said shaft non-rotatable relative to said casing, means adapted for shifting said reciprocable locking member in and out of engagement with said fixed locking member, and means carried by said reciprocable locking member adapted for locking said guard sleeve.

9. In steering gear locks and wherein a reciprocable locking member is adapted to be moved into and out of engagement with a complemental member carried by the steering post, means operative in the control of the operation of the reciprocable member, said means including two locking instrumentalities differing in operating characteristics, one of said instrumentalities being in permanent operating engagement with said member and adapted to provide the movements of the reciprocable locking member, the other instrumentality being operative to control when the first instrumentality may be operated to break the engagement between the locking members.

10. Means as in claim 9 characterized in that movement of the first instrumentality to restore the members to locked condition is independent of second instrumentality manipulation.

11. Means as in claim 9 characterized in that the first instrumentality is in the form of a key-operated lock positioned to locate its axial line wholly without the longitudinal planes of the locking members.

12. Means as in claim 9 characterized in that the reciprocable locking member carries a rack and the lock instrumentality includes a gear in permanent mesh with the rack, whereby movements of the gear by the lock will move the member between the member locking and unlocking positions.

13. The combination of a steering shaft, a non-rotatable reciprocable locking member sleeved on said shaft and adapted for holding said shaft stationary, said member having a rack formation as a permanent part thereof, and a lock including a gear co-operative with said rack for reciprocating said locking member.

14. The combination of a steering shaft, a casing through which said steering shaft extends, a non-rotatable locking member sleeved on said shaft in said casing, and adapted for holding said shaft stationary, said member having a rack formation as a permanent part thereof, a lock including a gear co-operative with said rack for reciprocating said locking member, and supporting means for said casing.

In testimony whereof I affix my signature in the presence of two witnesses.

JOSEPH P. LAVIGNE.

Witnesses:
ANNA M. DORR,
CHAS. W. STAUFFIGER.